United States Patent Office 3,197,433
Patented July 27, 1965

3,197,433
OPTICALLY CLEAR ORGANOPOLY-
SILOXANE RESINS
Harry F. Lamoreaux, Schenectady, N.Y., assignor to General Electric Company, a corporation of New York
No Drawing. Filed July 2, 1962, Ser. No. 207,077
7 Claims. (Cl. 260—46.5)

This application relates to tough, thermally stable, optically clear, solvent resistant organopolysiloxane resin materials.

Optically clear, synthetic resinous materials have obtained widespread use in the art. These optically clear, synthetic materials have been used as insulation for electrical and electronic components where it has been desirable to insulate and/or protect the components while at the same time being able to view the components. These synthetic resinous materials have offered certain advantages over glass in that they are relatively easy to handle and can be cast about almost any type of object and can be formed into almost any shape. These materials have also been used as substitutes in optical systems, since they can be cast into the desired lens shape without the necessity for the complicated polishing operations which are necessary for conventional glass lens elements. Synthetic resinous optical elements have been used in equipment such as lenses, telescopes and the like and have also been used in the formation of contact lenses for correcting human vision.

While these prior art optically clear, synthetic resinous materials have had many advantages, they have also had certain disadvantages. Thus, these materials have generally been formed of materials which have little stability at elevated temperatures and thus tend to distort and lose their optical clarity. In addition, these prior art materials have had relatively poor resistance to organic solvents as well as acids and alkalis. Furthermore, these materials have not had the desired abrasion resistance or the high electrical strength or the toughness which have been desired in certain applications.

The object of the present invention is to provide an optically clear, tough, solid, thermally stable, solvent resistant, high dielectric strength organopolysiloxane resinous materials.

This, and other objects of my invention, are accomplished by providing an organopolysiloxane resin comprising a substantially equal number of a first class of organocyclotetrasiloxane units and a second class of organocyclotetrasiloxane units, with substantially every unit of said first class being attached to four units of said second class through a silicon-bonded alkylene radical of at least two carbon atoms, with substantially every unit of said second class being attached through its 1- and 5-silicon atoms, respectively, to two units of said first class through said silicon-bonded alkylene radical, the valences of silicon other than the valences satisfied by oxygen in the cyclotetrasiloxane rings and the valences satisfied by silicon-bonded alkylene radicals being satisfied by monovalent hydrocarbon radicals free of olefinic unsaturation.

The organopolysiloxane resins within the scope of the present invention are best understood by their method of preparation. These organopolysiloxane resins are prepared by effecting reaction between two types of organocyclotetrasiloxanes. The first class of organocyclotetrasiloxane is an eight-membered ring of alternate silicon and oxygen atoms, with each silicon atom being attached by a silicon-carbon linkage to a monovalent hydrocarbon radical free of aliphatic unsaturation and with each silicon atom in the cyclotetrasiloxane also being attached to an alkenyl radical by a silicon-carbon linkage or to a hydrogen atom. This class of organocyclotetrasiloxane will be referred to hereinafter for the sake of brevity as a "tetrafunctional cyclotetrasiloxane" because the cyclotetrasiloxane contains four functional groups, i.e., hydrogen atoms or alkenyl radicals, which are available for reaction. These tetrafunctional cyclotetrasiloxanes can be described by the formula:

(1) 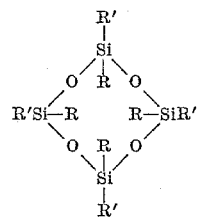

where R represents a monovalent hydrocarbon radical free of aliphatic unsaturation and R' represents a member selected from the class consisting of hydrogen and alkenyl radicals. Among the groups represented by R in Formula 1 can be mentioned, for example, alkyl radicals, e.g., methyl, ethyl, propyl, butyl, octyl, etc. radicals; aryl radicals, e.g., phenyl, naphthyl, toyly xylyl, etc. radicals; aralkyl radicals, e.g., benzyl, phenylethyl, etc. radicals; cycloalkyl radicals, e.g., cyclohexyl, cycloheptyl, etc. radicals. Preferably, the R radicals are methyl or phenyl radicals or a mixture of methyl and phenyl radicals. Included within the scope of the R' group of Formula 1 can be mentioned, for example, vinyl, allyl, alpha-methallyl, a pentenyl radical, an octenyl radical, etc. Preferably, where the R' group is alkenyl, the R' group represents a vinyl radical.

Included among the tetrafunctional cyclotetrasiloxanes of Formula 1 can be mentioned, for example, 1,3,5,7-tetramethyl - 1,3,5,7 - tetravinylcyclotetrasiloxane; 1,3,5,7-tetrahydro-1,3,5,7 - tetramethylcyclotetrasiloxane; 1,3,5,7-tetraallyl - 1,3,5,7 - tetraphenylcyclotetrasiloxane; 1,3,5,7-tetrahydro - 1,3,5,7-tetraphenylcyclotetrasiloxane; 1,3,5,7-tetravinyl-1,5-dimethyl - 3,7 - diphenylcyclotetrasiloxane, etc.

The second class of organocyclotetrasiloxane employed as a starting material in the preparation of the organopolysiloxane resins of the present invention is an eight-membered ring containing alternate silicon and oxygen atoms with the 3- and 7-silicon atoms containing two silicon-bonded monovalent hydrocarbon radicals free of aliphatic unsaturation and with the 1- and 5-silicon atoms each containing both one monovalent hydrocarbon radical free of aliphatic unsaturation and one member selected from the class consisting of hydrogen and a silicon-bonded alkenyl radical. For brevity, this second class of organocyclotetrasiloxane will be referred to hereinafter as the "difunctional cyclotetrasiloxane." This cyclotetrasiloxane contains two silicon-bonded hydrogen atoms or silicon-bonded alkenyl radicals per molecule and thus has two points available for further reaction. These difunctional cyclotetrasiloxanes can be represented by the formula:

(2) 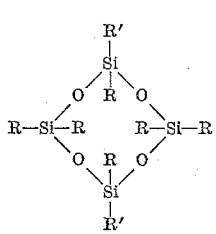

where R and R' are as previously defined. Illustrative of the difunctional cyclotetrasiloxanes within the scope of Formula 2 are, for example, 1,5-divinyl-1,3,3,5,7,7-hexamethylcyclotetrasiloxane; 1,5 - dihydro - 1,3,3,5,7,7-hexamethylcyclotetrasiloxane; 1,5-diallyl-1,3,3,5,7,7-hexaphenylcyclotetrasiloxane; 1,5 - dihydro-1,3,3,5,7,7-hexaphenylcyclotetrasiloxane, 1,5 - divinyl-1,5-diphenyl-3,3,7,7-tetramethylcyclotetrasiloxane, etc.

The cyclotetrasiloxanes within the scope of Formula 1 and Formula 2 can be formed by conventional means and these cyclic siloxanes are known in the art. For example, the tetrafunctional cyclotetrasiloxanes within the scope of Formula 1 can be prepared by the hydrolysis and condensation of a silane containing two silicon-bonded chlorine atoms, one silicon-bonded hydrogen atom and one silicon-bonded monovalent hydrocarbon radical within the scope of R of Formula 1. This hydrolysis and condensation product is fractionally distilled to produce tetrafunctional cyclotetrasiloxanes within the scope of Formula 1. Likewise, tetrafunctional cyclotetrasiloxanes within the scope of Formula 1 can be prepared by the hydrolysis and condensation of silanes containing two silicon-bonded chlorine atoms, one silicon-bonded monovalent hydrocarbon radical within the scope of R, and one silicon-bonded alkenyl radical within the scope of R'. Fractional distillation of the hydrolysis and condensation product will yield the cyclotetrasiloxanes within the scope of Formula 1.

The difunctional cyclotetrasiloxanes within the scope of Formula 2 are prepared by the cohydrolysis and cocondensation of a mixture of organochlorosilanes, one of which contains two chlorine atoms and two silicon-bonded monovalent hydrocarbon radicals within the scope of R of Formula 2 and the other of which contains two silicon-bonded chlorine atoms, one silicon-bonded R group and one silicon-bonded hydrogen atom or silicon-bonded alkenyl radical within the scope of R'. Generally, these two types of silanes are mixed in equal proportions and the resulting cohydrolysis and cocondensation product is fractionally distilled to produce the difunctional cyclotetrasiloxane of Formula 2.

The organopolysiloxane resins within the scope of the present invention are prepared by effecting reaction between a tetrafunctional cyclotetrasiloxane within the scope of Formula 1 and a difunctional cyclotetrasiloxane within the scope of Formula 2. The reaction involved is an addition reaction in which the silicon-bonded hydrogen atoms of one of the cyclotetrasiloxanes react with the olefinic double bond of the other cyclotetrasiloxane to form an alkylene linkage or bridge between the two cyclotetrasiloxanes. It is immaterial, for purposes of the present invention, whether the silicon-bonded hydrogen atoms are attached to the tetrafunctional cyclotetrasiloxane or to the difunctional cyclotetrasiloxane. Likewise, it is immaterial as to whether the silicon-bonded alkenyl radicals are attached to the tetrafunctional cyclotetrasiloxane or the difunctional cyclotetrasiloxane. The only requirement for the preparation of the organopolysiloxane resins of the present invention is that one of the two cyclotetrasiloxanes contain all of the silicon-bonded hydrogen atoms and that the other of the cyclotetrasiloxanes contain all of the silicon-bonded alkenyl radicals.

To illustrate the first stages in the preparation of the organopolysiloxane resins of the present invention, there is shown below the reaction between one molecule of a tetrafunctional cyclotetrasiloxane and one molecule of a difunctional cyclotetrasiloxane. In Formula 3 below is shown the reaction between a tetrafunctional cyclotetrasiloxane containing a vinyl radical attached to each of its silicon atoms and a difunctional cyclotetrasiloxane containing a hydrogen atom attached to the 1- and 5-silicon atoms. This addition reaction results in the joining of the two molecules through an alkylene (ethylene) radical which is attached to one silicon atom of each of the two cyclotetrasiloxanes through silicon-carbon linkages.

(3)
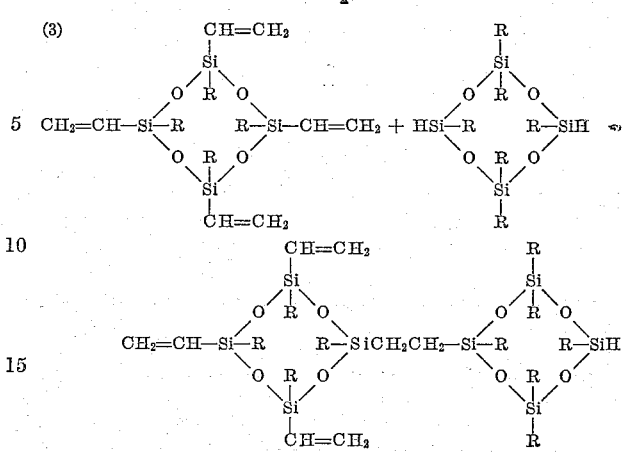

As the reaction of Formula 3 is continued through the reaction of other molecules of the tetrafunctional cyclotetrasiloxane and difunctional cyclotetrasiloxane of the type shown in Formula 3, it is seen that another vinyl-containing tetrafunctional cyclotetrasiloxane molecule can react with the silicon-bonded hydrogen atom on the right hand silicon atom of the product of formula 3 and that other difunctional cyclotetrasiloxane molecules containing silicon-bonded hydrogen atoms can react with the silicon-bonded vinyl radicals in the product of Equation 3. This procedure is repeated until a complicated cross-linked structure is formed. This cross-linked material is the organopolysiloxane resin of the present invention.

To illustrate the structure of a portion of the organopolysiloxane resins of the present invention in a simplified fashion, consider that the symbol:

(4)

represents the radical:

(5)
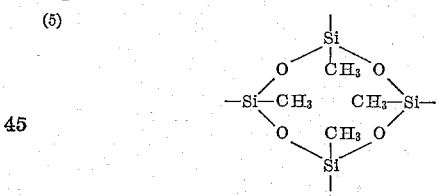

When effecting reaction between 1,5-divinyl-1,3,3,5,7,7-hexamethylcyclotetrasiloxane and 1,3,5,7 - tetrahydro-1,3,5,7-tetramethylcyclotetrasiloxane and using the symbol of Formula 4, it is seen that the structure of a portion of the resinous material within the scope of the present invention would have the structure:

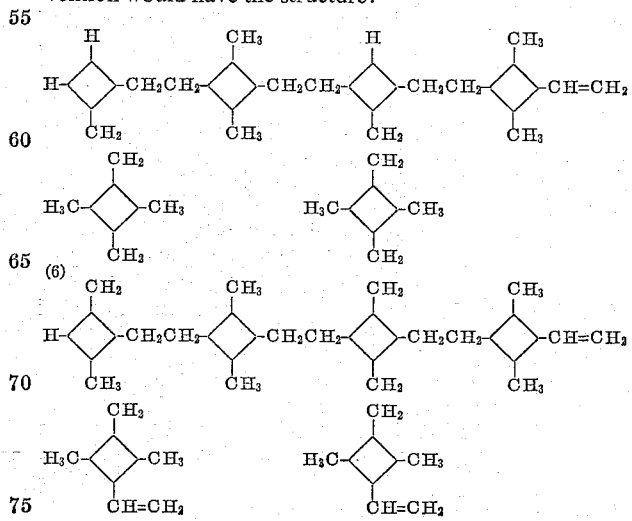

In broader terms, the polymers of the present invention can be described as having the structure:

(7)
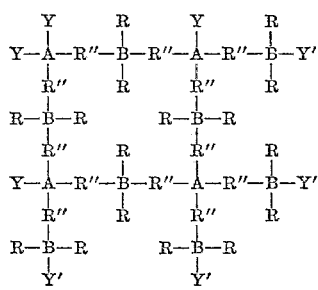

where R and R' are as previously defined, A is the nucleus of a tetrafunctional organopolysiloxane within the scope of Formula 1, B is the nucleus of a difunctional organopolysiloxane within the scope of Formula 2, with both A and B corresponding to the formula:

(8)
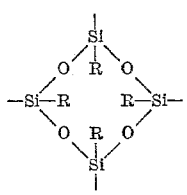

where R'' is a divalent alkylene radical derived from the addition of a Si-H linkage of one organocyclopolysiloxane to an R' radical of another organocyclopolysiloxane, and Y and Y' are different from each other and one is an R' radical and the other is hydrogen.

While the portion of the structure shown in Formula 7 has been shown as a planar structure for purposes of simplicity, it is apparent that the compositions of the present invention have a three-dimensional molecular structure because of the fact that the cyclotetrasiloxane rings are free to rotate, producing cross-linked, three-dimensional structures.

In preparing the organopolysiloxane resins of the present invention, the difunctional cyclotetrasiloxane and the tetrafunctional cyclotetrasiloxane are used in the ratio of two moles of the former per mole of the latter to produce the cross-linked structure. While the polymeric materials of the present invention result from two moles of the difunctional material per mole of the tetrafunctional material, it is apparent that excesses of either the difunctional or tetrafunctional material may be employed. However because of the nature of the reactants, the reaction product will be formed in substantially the ratio of two moles of difunctional material per mole of tetrafunctional materials. This ratio of cyclotetrasiloxanes can vary slightly from the ratio given because the ends of the polymer molecules can be all difunctional material or all tetrafunctional material, depending on which of the materials is present in stoichiometric excess.

The reaction between the tetrafunctional cyclotetrasiloxane of Formula 1 and the difunctional cyclotetrasiloxane of Formula 2 to produce the organopolysiloxane resins of the present invention is preferably carried out in the presence of a catalyst which is operative to catalyze the addition of silicon-hydrogen bonds across olefinic double bonds. Any such catalyst can be employed. Among the many useful catalysts for this addition reaction are finely divided platinum as disclosed in Patent 2,970,150—Bailey and chloroplatinic acid as disclosed in Patent 2,823,218—Speier et al. However, the preferred catalyst is the catalyst described in my copending application Serial No. 207,076, filed concurrently herewith and assigned to the same assignee as the present invention. This copending application is hereby incorporated by reference into the present application for a complete description of these preferred catalysts and their method of preparation. Briefly, these catalysts are prepared by heating a mixture of chloroplatinic acid and either an alcohol, an acid or an aldehyde at a temperature of about 60 to 80° C. at a reduced pressure until the reaction product has a ratio of about 2.0 to 3.5 atoms of chlorine per atom of platinum.

The amount of catalyst employed in preparing the products of the present invention is a function of the particular catalyst employed and the temperature at which the reaction between the tetrafunctional cyclotetrasiloxane of Formula 1 is reacted with the difunctional cyclotetrasiloxane of Formula 2. Where platinum is employed as the catalyst, the catalyst is generally present in an amount equal to from about $10^{-3}$ to $10^{-5}$ moles of catalyst per mole of the cyclotetrasiloxane of Formula 1 or Formula 2 which contains the silicon-bonded alkenyl radicals. When chloroplatinic acid is employed, the catalyst is generally used in an amount equal to from about $10^{-4}$ to $10^{-6}$ moles of platinum per mole of the alkenyl-containing cyclotetrasiloxane within the scope of either Formula 1 or formula 2. Where the catalyst is one of the catalyst of my copending application, the catalyst is employed in an amount sufficient to provide from about $10^{-4}$ to $10^{-7}$ gram atom of platinum per mole of the alkenyl-containing cyclotetrasiloxane.

Generally, the reaction is effected at a temperature of from about 30 to 120° C. However, with active catalysts such as chloroplatinic acid or the catalyst of my copending application, the reaction may be effected at room temperature, e.g., a temperature of around 20 to 25° C. The time required for completion of the reaction is, of course, a function of the activity of the catalyst employed and its concentration, a function of the particular cyclotetrasiloxane employed and a function of the temperature of the reaction. In general, the reaction can be accomplished in times which vary from about 30 minutes at a temperature of about 50° C. to 24 hours or more when room temperature reaction is employed.

The following examples are illustrative of the practice of my invention and are not intended for purposes of limitation.

*Example 1*

A catalyst within the scope of my aforementioned copending application was prepared by dissolving one part by weight of chloroplatinic acid hexahydrate in ten parts of octyl alcohol and heating the solution at 70 to 75° C. at 25 millimeters for 16 hours during which time all water and hydrogen chloride was removed. The pressure was then reduced to 5 millimeters to remove all unreacted octyl alcohol. At the end of this time a product was obtained which was a dark, reddish-brown liquid soluble in alcohols, acetone, benzene, hexane, xylene, toluene and other common solvents. Chemical analysis of this mixture showed it to contain 3.5 atoms of chlorine per atom of platinum and 0.035 gram platinum per gram of the mixture.

A mixture was prepared in the ratio of one mole of 1,3,5,7 - tetravinyl - 1,3,5,7-tetramethylcyclotetrasiloxane and two moles of 1,5-dihydro-1,3,3,5,7,7-hexamethylcyclotetrasiloxane. To this mixture was added a sufficient amount of the catalyst prepared above to provide $3 \times 10^{-6}$ gram atoms of platninum per mole of the 1,3,5,7-tetravinyl-1,3,5,7-tetramethylcyclotetrasiloxane. After thoroughly blending these ingredients, the resulting mixture was allowed to stand at room temperature for about 72 hours, during which time the viscosity of the mixture increased until a consistency similar to that of molasses was reached. At this time the viscous mixture was heated at 60° C. for 1 hour, during which time it was quickly converted to an optically clear, hard, glass-like polymer containing a first class of organocyclotetrasiloxane units and a second class of organocyclotetrasiloxane units, with there being substantially twice the number of said second class of organocyclotetrasiloxane units as the number of said first class of organocyclotetrasiloxane units, with substantially every unit of said first class being attached to four units of said second class through a silicon-bonded ethylene radical, with substantially every unit of said second class being attached through its 1- and 5-silicon atoms, respectively, to two units of said first class through said silicon-bonded alkylene radicals, with the valences of silicon other than the valences satisfied by oxygen in the cyclotetrasiloxane rings and the valences satisfied by silicon-bonded ethylene radicals being satisfied by methyl radicals. This polymer had a structure similar to the structure shown in Formula 7. The polymeric material exhibited no change in weight or physical appearance when maintained at a temperature of 200° C. for 48 hours, and exhibited no changes in physical appearance or weight when boiled for 48 hours in acetone, toluene or trichloroethylene. Soaking the polymer in concentrated alcoholic potassium hydroxide solution for 2 weeks had no visible effect on the material.

*Example 2*

When the procedure of Example 1 was repeated up to the point where the reaction mixture reached the viscosity of molasses, a glass tape was dipped into the mixture and excess mixture allowed to drain off. A coated glass tape was formed by heating the tape at a temperature of 160° C. for 1½ hours. The resulting coated tape had a hard, clear, smooth coating and was useful as insulation for a dynamo electric machine.

*Example 3*

When the procedure of Example 1 was repeated except that 1,5-dimethyl-1,5-dihydro-3,3,7,7-tetraphenylcyclotetrasiloxane was substituted for the hydrogen-containing siloxane of Example 1, a product comparable to that of Example 1 was formed. This material differed, however, from the product of Example 1 in that the cyclotetrasiloxane units derived from the difunctional cyclotetrasiloxane contained a silicon-bonded methyl radical on the 1- and 5-silicon atoms and contained two silicon-bonded phenyl groups on the 3- and the 7-silicon atoms.

*Example 4*

A solution was formed from a mixture of ingredients in the ratio of two moles of 1,5-diallyl-1,3,3,5,7,7-hexamethylcyclotetrasiloxane and 1,3,5,7-tetrahydro-1,3,5,7-tetramethylcyclotetrasiloxane. To this solution was added a sufficient amount of the catalyst of Example 1 as a 5% solution of the catalyst in amyl alcohol to provide $1 \times 10^{-5}$ gram atoms platinum per mole of the allyl radical-containing cyclotetrasiloxane. This mixture was heated at a temperature of 75° for 1 hour, during which time the solution was converted into an optically clear, hard, tough organopolysiloxane resin within the scope of the present invention. This material was substantially identical to the material described in Formula 7 except that the cyclotetrasiloxane radicals were joined by propylene (trimethylene) radicals. This organopolysiloxane resin exhibited properties substantially identical to the resin of Example 2.

While the foregoing examples have illustrated the preparation of a number of organopolysiloxane resins within the scope of the present invention, it should be understood that these resinous materials can be prepared from tetrafunctional cyclotetrasiloxanes within the scope of Formula 1 other than those specifically illustrated in the examples. Likewise, difunctional cyclotetrasiloxanes within the scope of Formula 2 other than those specifically illustrated, can also be employed to prepare organopolysiloxane resins of the scope previously defined. In the examples, the tetrafunctional cyclotetrasiloxane resin has been illustrated by materials in which the four silicon-bonded monovalent hydrocarbon radicals were the same. It should be understood, however, that these four silicon-bonded monovalent hydrocarbon radicals free of aliphatic unsaturation can be different materials. Thus, for example, two of the monovalent hydrocarbon radicals free of olefinic unsaturation can be methyl while the other two could be phenyl. Such a material would be prepared, for example, by the cohydrolysis and cocondensation of ethylvinyldichlorosilane and phenylvinyldichlorosilane by methods previously described.

It should also be understood that the products of the present invention can contain various fillers such as carbon black, clay, zinc oxide, whiting slate flour, finely divided silica such as fume silica, precipitated silica, silica aerogel, etc. These fillers can be incorporated in amounts of from 10 to 200 or more parts per part of the organopolysiloxane resins of the present invention. These fillers can be incorporated into the organocyclotetrasiloxane starting materials or can be added after the reaction begins but before the reaction passes the viscous fluid stage. While the presence of fillers interferes with the optical clarity of the products of the present invention, the fillers increase the toughness of the resins.

What I claim as new and desire to secure by Letters Patent of the United States is:

1. An organopolysiloxane resin comprising a first class of organocyclotetrasiloxane units and a second class of organocyclotetrasiloxane units, there being present in said resin substantially twice the number of said second class as of said first class, with substantially every unit of said first class being attached to four units of said second class through a silicon-bonded alkylene radical of at least two carbon atoms, with substantially every unit of said second class being attached through its 1- and 5-silicon atoms, respectively, to two and only two units of said first class through said silicon-bonded alkylene radical, substantially all of the valences of silicon other than the valences satisfied by oxygen in the cyclotetrasiloxane rings and the valences satisfied by silicon-bonded alkylene radicals being satisfied by monovalent hydrocarbon radicals free of aliphatic unsaturation.

2. The organopolysiloxane resin of claim 1 in which the monovalent hydrocarbon radicals are selected from the class consisting of phenyl radicals and methyl radicals.

3. The composition of claim 1 in which the monovalent hydrocarbon radicals are methyl radicals.

4. The composition of claim 1 in which the alkylene radicals are ethylene radicals.

5. The organopolysiloxane resin of claim 1 in which the alkylene radicals are propylene radicals.

6. A clear, hard organopolysiloxane resin comprising a first class of organocyclotetrasiloxane units and a second class of organocyclotetrasiloxane units, with there being present substantially twice as many of said second class as said first class, with substantially every unit of said first class being attached to four units of said second class through an ethylene radical, with substantially every unit of said second class being attached through its 1- and 5-silicon atoms, respectively, to two and only two units of said first class through said ethylene radical, substantially all of the valences of silicon other than the valences satisfied by oxygen in the cyclotetrasiloxane rings and the valences satisfied by silicon-bonded ethylene radicals being satisfied by methyl radicals.

7. An organopolysiloxane resin comprising a first class of organocyclotetrasiloxane units and a second class of organocyclotetrasiloxane units, there being present in said resin substantially twice the number of said second class of organocyclotetrasiloxane units as of said first class of organocyclotetrasiloxane units, with substantially every unit of said first class of organocyclotetrasiloxane units being attached to four units of said second class of organocyclotetrasiloxane units through a silicon-bonded alkylene radical of at least two carbon atoms, with substantially every unit of said second class of organocyclotetrasiloxane unit being attached through its 1- and 5- silicon atoms, respectively, to two and only two units of said first class of organocyclotetrasiloxane units through said silicon-bonded alkylene radical, substantially of the valences of silicon other than the valences satisfied by oxygen in the cyclotetrasiloxane rings and the valences satisfied by silicon-bonded alkylene radicals being satisfied by monovalent hydrocarbon radicals free of aliphatic unsaturation, said resin having been prepared by effecting reaction in the presence of a catalyst operative to catalyze the addition of silicon-hydrogen bonds across olefinic double bonds and under conditions favorable to such addition between a first class of organocyclotetrasiloxane having the formula,

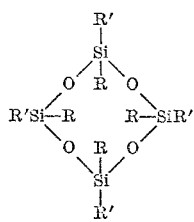

and a second class of organocyclotetrasiloxane having the formula,

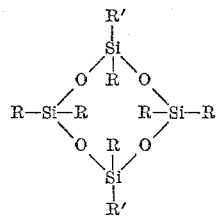

where R is a monovalent hydrocarbon radical free of aliphatic unsaturation and R' represents a member selected from the class consisting of hydrogen and alkenyl radicals, the R' groups of one of the classes of organocyclotetrasiloxane being hydrogen and the R' groups of the other of the classes of organocyclotetrasiloxane being other than hydrogen, said organocyclotetrasiloxanes being employed in the ratio of one mole of said first class of organocyclotetrasiloxane to two moles of said second class of organocyclotetrasiloxane.

References Cited by the Examiner

UNITED STATES PATENTS

| | | | |
|---|---|---|---|
| 2,823,218 | 2/58 | Speier et al. | 260—46.5 |
| 2,851,473 | 9/58 | Wagner et al. | 260—46.5 |
| 2,970,150 | 1/61 | Bailey | 260—46.5 |

MURRAY TILLMAN, *Primary Examiner.*

WILLIAM H. SHORT, *Examiner.*